United States Patent [19]

Nishibe

[11] Patent Number: 5,488,276
[45] Date of Patent: Jan. 30, 1996

[54] APPARATUS FOR DRIVING AND CONTROLLING MOTOR

[75] Inventor: Yasushi Nishibe, Niwa, Japan

[73] Assignee: Kabushiki Kaisha Tokai-Rika-Denki-Seisakusho, Aichi, Japan

[21] Appl. No.: 170,817

[22] Filed: Dec. 21, 1993

[30] Foreign Application Priority Data

Dec. 25, 1992 [JP] Japan ..................... 4-346987

[51] Int. Cl.⁶ .................................. G05B 5/00
[52] U.S. Cl. .................... 318/473; 318/469; 318/282; 318/286; 318/641; 49/28
[58] Field of Search ............... 307/91, 101; 361/23–24, 361/31, 33; 318/445–446, 466–473, 280, 282, 283, 285, 286, 641; 49/26, 28, 31

[56] References Cited

U.S. PATENT DOCUMENTS 3,936,711  2/1976  Gay ........................... 388/816
4,550,277  10/1985  Carney ..................... 388/809
4,779,031  10/1988  Arends ..................... 318/565
5,038,088  8/1991  Arends ..................... 318/565
5,351,439  10/1994  Takeda et al. ............. 49/28

*Primary Examiner*—David S. Martin
*Attorney, Agent, or Firm*—Oliff & Berridge

[57] ABSTRACT

An apparatus for driving and controlling a motor which moves a movable portion of a vehicle by driving force of the motor. The apparatus includes a drive stopping circuit for comparing a value of current detected by a current detection circuit, which detects drive current of the motor when the movable portion is being moved, with a predetermined comparison current value, and for stopping driving of the motor at a time when a detected current value exceeds the comparison current value. The apparatus also includes a comparison current varying circuit for varying the comparison current value based on a temperature of an environment of the movable portion. Since it is possible to carry out temperature compensation based on ordinary drive current and lock current of the motor, the comparison current value can be set within a wide range.

9 Claims, 8 Drawing Sheets

APPARATUS FOR DRIVING AND CONTROLLING MOTOR

BACKGROUND OF THE INVENTION

1. Field of the Invention

The present invention relates to an apparatus for driving and controlling a motor which moves (raises and lowers) a movable portion of a vehicle, such as a door glass of a power window apparatus, by the driving force of the motor.

2. Description of the Related Art

A power window apparatus is provided with a motor for raising and lowering a door glass.

Generally, manual switches and an auto-switch are provided at a location near the driver's seat as switches for the power window apparatus.

When the driver operates one of the manual switches, the contact for raising or the contact for lowering is turned on. Upon termination of the operation, the manual switch is automatically returned so that the contact is turned off. Since driving of the motor is continued only when the operation of the manual switch continues, the raising and lowering of the door glass can be stopped halfway.

In an automatic operation mode, once the contact for raising or the contact for lowering of the auto-switch is turned on, driving of the motor is continued until the door glass is completely closed or is completely opened even after the driver releases the auto-switch. When the door glass is completely closed, the movement of the door glass is prevented by the window frame or the like, whereby the drive current of the motor increases. Further, driving of the motor may be stopped when the drive current exceeds a predetermined level, or when an abnormal increase in drive current (hereinafter referred to as "abnormal current") due to the catching of a foreign object on the locus of upward movement of the door glass is detected. In such a system, there is provided a full-closure detecting switch for detecting that the door glass is nearing its full closure position so that a current increase due to a foreign object may be discriminated from a current increase due to the full closure of the door glass. Further, it is possible to reverse the motor for a predetermined period of time when the catching of a foreign object is detected.

However, resistance to the movement of the door glass is effected by the temperature of the environment of the door glass, and the drive current of the motor varies in accordance with variation of the resistance. Namely, since freezing and dew condensation occur at low temperatures (especially, at temperatures near the freezing temperature), the movement of the regulator mechanism becomes dull. Further, the smooth movement of the door glass is hindered by the guide portions for the door glass (such as the window frame, weatherstrips made of rubber, and the like) due to the change in hardness of rubber parts, such as the weatherstrips and the like. Accordingly, it is determined that the detected level corresponds to lock current, which occurs when the door glass is fully closed, or that there is abnormal current, even if the door glass has not been completely closed or no foreign object exists on the locus of movement of the door glass. In this case, a drawback arises in that the motor is erroneously stopped such that the door glass cannot be fully closed in a low temperature state.

To obviate the above-mentioned drawback, a system has been considered in which a threshold value for detecting the abnormal current is set to be relatively high so as to be adapted to low temperatures. In this case, setting of the threshold value becomes difficult because the difference between the drive current of the motor at low temperatures and the motor lock current at ordinary temperatures is extremely small. Further, either at ordinary temperatures or at higher temperatures, there may be cases in which the threshold value becomes higher than the motor lock current. In such cases, the overloaded state of the motor continues.

SUMMARY OF THE INVENTION

The present invention has been accomplished by taking the above-mentioned facts into consideration, and the object of the present invention is to provide an improved apparatus for driving and controlling a motor which can prevent the motor from being continuously driven in an overloaded state regardless of whether the temperature of the environment is low or high.

The present invention provides an improved apparatus for driving and controlling a motor which moves a movable portion of a vehicle by the driving force of the motor. The apparatus comprises current detection means for detecting current flowing through the motor when the motor is driven; drive and control means for comparing a value of current, which is detected by the current detection means when the movable portion is being moved, with a predetermined comparison current value, and for controlling driving of the motor at a time when the detected current value exceeds the comparison current value; and comparison current varying means for varying the comparison current value based on the temperature of the environment of the movable portion.

When the movable portion is moved by the driving force of the motor, the motor lock current is substantially constant if the temperature of the environment is an ordinary temperature. By comparing the current value detected by the current detection means with a comparison current value which is smaller than the motor lock current, it is possible to properly control the driving state of the motor based on the results of determining whether the detected current value exceeds the comparison current value.

The motor lock current becomes smaller when the temperature of the environment increases, and becomes greater when the temperature of the environment decreases.

When the temperature of the environment of the movable portion is high, resistance to the movement of the movable portion decreases so that the drive current of the motor also decreases. On the other hand, when the temperature of the environment is low, resistance to the movement of the movable portion increases so that the drive current of the motor also increases.

Taking the above facts into consideration, the comparison current varying means varies the comparison current such that the amount of variation of the comparison current becomes substantially equal to the amount of variation of the motor lock current or the ordinary drive current of the motor. For example, the motor lock current varies linearly (at a constant rate) with respect to the temperature of the environment. Therefore, the difference between the comparison current and the motor lock current can always be maintained constant by varying the comparison current at a rate which is substantially the same as the rate of change of the motor lock current.

The ordinary drive current of the motor drastically increases when the temperature becomes lower than a specific temperature (which is about $-10°$ C. to $-20°$ C.). Accordingly, the difference between the comparison current and the ordinary drive current of the motor can always be maintained substantially constant by varying the comparison current such that the variation of the comparison current follows the variation of the drive current.

In both of the above-mentioned cases, the comparison current is always maintained higher than the ordinary drive current of the motor and lower than the motor lock current regardless of temperature of the environment. Accordingly, in a case in which the state of a movable portion is judged on the basis of the drive current of the motor, judgment can be made by comparison using a proper comparison current regardless of the temperature of the environment. Further, since the comparison current never exceeds the motor lock current, temperature compensation for the motor itself can be carried out reliably.

As described above, the apparatus for driving and controlling a motor has an excellent effect in that the motor can be prevented from being driven in a overloaded state regardless of whether the temperature is low or high.

BRIEF DESCRIPTION OF THE ACCOMPANYING DRAWINGS

DETAILED DESCRIPTION OF THE PREFERRED EMBODIMENTS

FIRST EMBODIMENT

Figure 2:
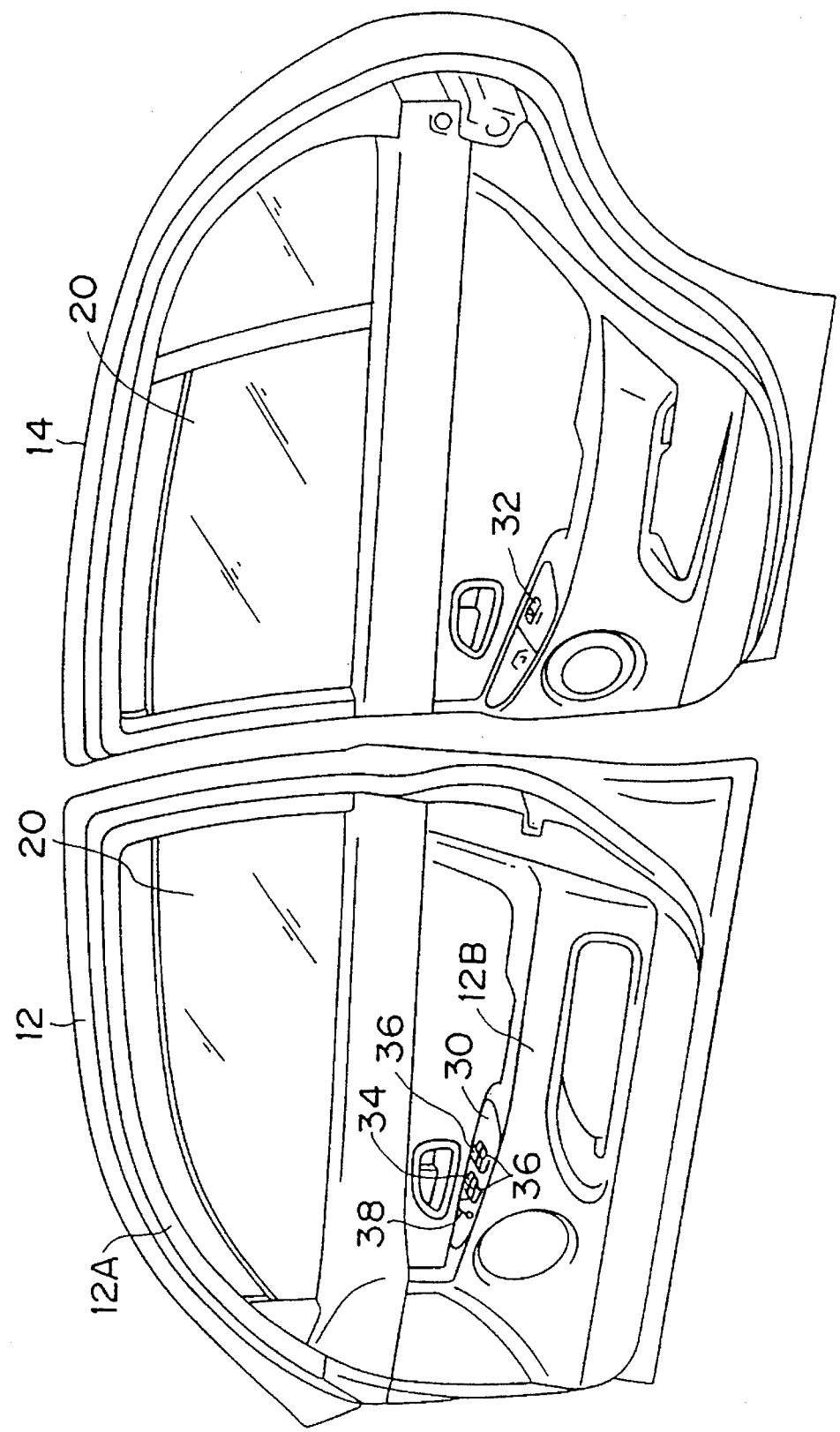
FIG. 2 is a perspective view of a door of a vehicle as viewed from the interior of the vehicle.

FIG. 2 shows a front door 12 located on the side of the driver's seat of a vehicle, and a rear door 14 located on the same side, in which a power window apparatus 10 according to a first embodiment is employed. In each of the doors 12, 14, a window regulator 16 is disposed for raising and lowering a door glass 20 (FIG. 3 shows the interior of the front door 12 on the side of the driver's seat).

Figure 3:
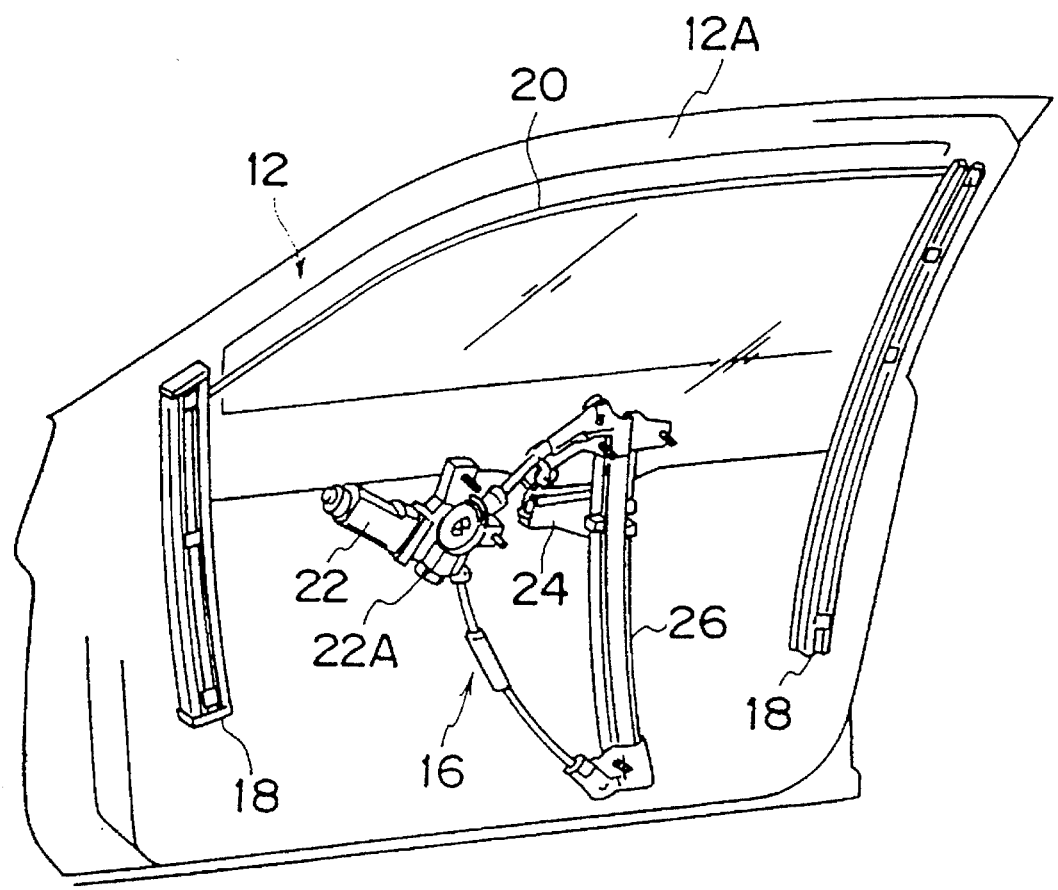
FIG. 3 is a perspective view showing the inner structure of a door at a driver's seat.

In this first embodiment, the window regulator 16 is of a so-called wire type, as shown in FIG. 3. A wire is wound on a rotary plate 22A attached to the drive shaft of a motor 22. The end of the wire is connected to a holding channel 24 which supports the lower edge of the door glass 20. The holding channel 24 is guided by a main guide 26 for vertical movement. When the motor 22 rotates in the forward direction or the reverse direction, the rotational drive force is transmitted to the holding channel 24 via the wire so that the door glass 20 is raised or lowered along a glass guide 18. The structure of the window regulator 16 is not limited to the wire type, and may be of an X-arm type, or a so-called self-propelled motor type in which a motor itself moves along a rack.

When the door glass 20 is raised by the motor 22, the peripheral edge portion of the door glass 20 fits into a weatherstrip (not illustrated), which is made of rubber and is assembled in a frame 12A of the door 12, so that the open portion of the door frame 12A is closed. When the door glass 20 is lowered by the motor 22, the open portion of the frame 12A of the door 12 is opened.

The motor 22 is driven in response to the operation of a power window master switch 30 and door switches 32 which are provided on the doors 12, 14 shown in FIG. 2. The door switches 32 are provided on the doors 14 other than the door 12 at the driver's seat, while the power window master switch 30 is provided on a door armrest 12B of the door 12 at the driver's seat. The power window master switch 30 may be disposed at a different position provided that a driver seated in the driver's seat can easily operate the power window master switch 30.

The power window master switch 30 includes an auto/manual switch 34 for automatically or manually operating the motor 22 in the door 12, and a plurality (three in the first embodiment) of door switches 36 for manually operating the motor 22 in each of the doors 14. The power window master switch 30 also includes a lock switch 38 for preventing the motors 22 from being driven even when the door switches 32, 36 are operated.

Since the auto/manual switch 34 is of a two-step type, the auto/manual switch 34 can be moved in two separate steps in each of two opposite directions. When the switch 34 is moved one step, the motor 22 in the door 12 is driven only in the period when operation of the switch 34 continues (manual operation). When the switch 34 is moved two steps, the motor 22 of the door 12 is driven until the door glass 20 reaches a predetermined position even after operation of the switch 34 is discontinued (automatic operation).

In response to the operation of the power window master switch 30 or the door switch 32, the motor 22 is driven so as to rotate the rotary plate 22A (shown in FIG. 3) in the forward direction or the reverse direction so that the door glass 20 is raised or lowered.

Figure 1:
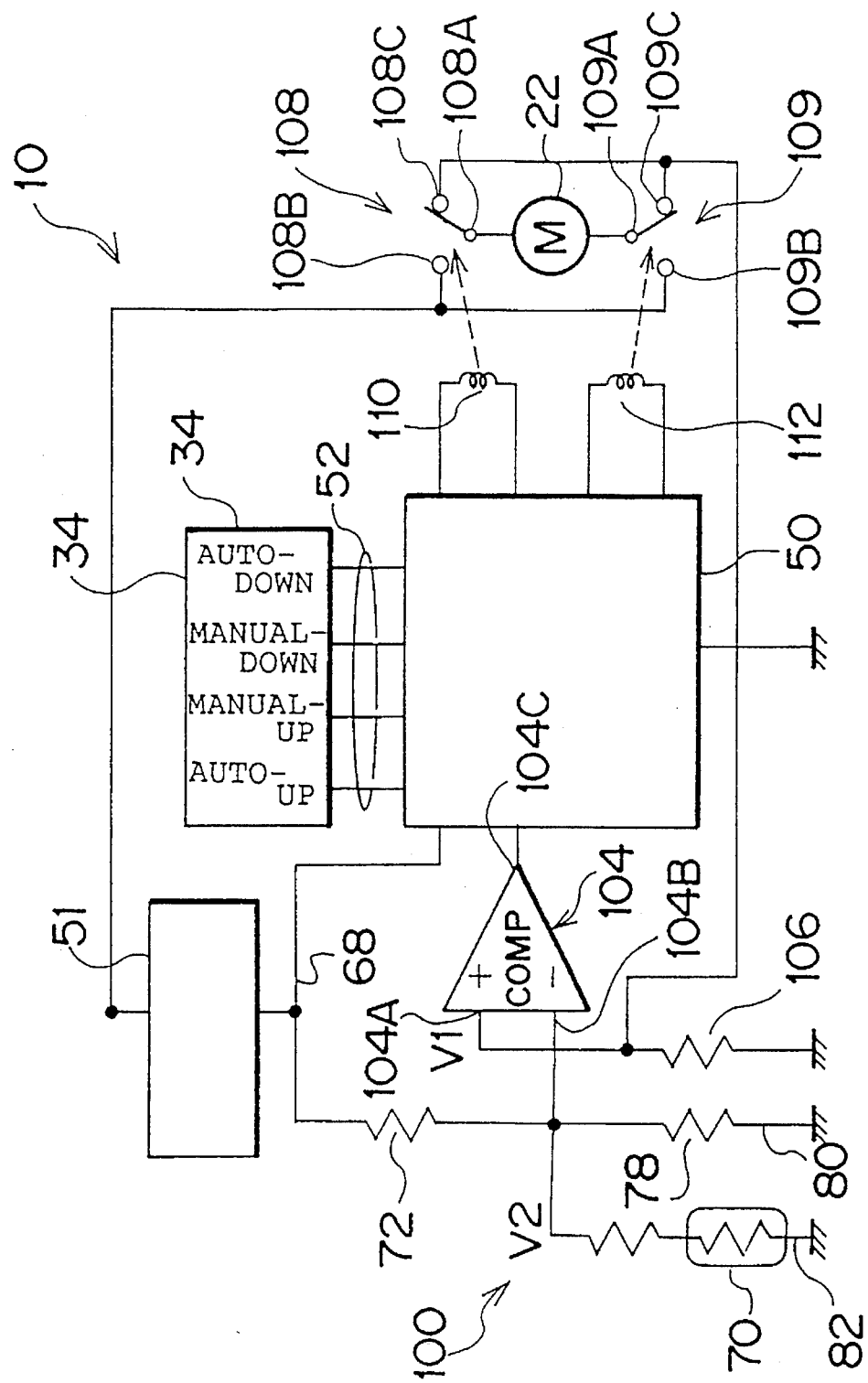
FIG. 1 is a circuit diagram showing an apparatus for driving and controlling a power window apparatus according to a first embodiment of the present invention.

FIG. 1 shows a power window control section 50 for controlling driving of the motor 22 in response to operation of the auto/manual switch 34. The power window control section 50 is driven by electric power from a power supply circuit 51.

As shown in FIG. 1, connected to the power window control section 50 are signal lines 52 from the switches of the auto/manual switch 34. The control section 50 supplies the motor 22 with drive current for forward rotation and reverse rotation in accordance with the state of the auto/manual switch 34.

The terminals of the motor 22 controlled by the power window control section 50 are respectively connected to common terminals 108A and 109A of a normal-close relay switch 108 and a normal-open relay switch 109. First contacts 108B, 109B of the respective relay switches 108, 109 are connected to the power supply line. Second contacts 108C, 109C are connected to a point between a resistor 106 and a positive input terminal 104A of a comparator 104 which form a comparator circuit 100, as will be described hereinafter. Therefore, when the motor 22 is driven, a voltage $V_1$, whose amplitude corresponds to the product of the resistance of the resistor 106 and current flowing through the resistor 106, namely current flowing through the motor 22, is input to the positive input terminal 104A.

The movable contacts of the relay switches 108, 109 are changed over between the first and second contacts by coils 110, 112. Accordingly, the motor 22 is rotated forwardly or reversely by one of the coils 110, 112 being excited.

The comparator circuit 100 is connected to the power window control section 50. The comparator circuit 100 outputs a lock signal which indicates that the door glass 20 is in a fully closed or a fully opened state. Due to the input of the lock signal, the power window control section 50 stops the driving of the motor 22.

One end of a resistor 72 which is part of the comparator circuit 100 is connected to a power supply line 68 extending from the power supply circuit 51. The other end of the resistor 72 is connected to one end of a resistor 78, the other end of which is connected to an earth line 80.

Connected to the line between the resistor 72 and the resistor 78 are one end of a thermistor 70 and the negative input terminal 104B of the comparator 104. The other end of the thermistor 70 is connected to an earth line 82. Accordingly, the negative input terminal 104B is supplied with a voltage $V_2$ (variable) which is output from a circuit which includes the resistor 72, the resistor 78 and the thermistor 70 and acts to divide the voltage of the power source for outputting the voltage $V_2$.

The output terminal 104C of the comparator 104 is connected to the above-described power window control section 50.

Although the resistances of the resistors 72, 78 are constant, the resistance of the thermistor 70 changes in accordance with the temperature. The thermistor 70 used in the first embodiment has a negative thermal characteristic, and the resistance $R_0$ of the thermistor 70 is expressed by the following equation:

$$R_0 = R' \times EXP\{B \times (1/T - 1/T')\}[\Omega] \quad (1)$$

wherein

R': resistance at a temperature T' (T' is 0° C. (or an ordinary temperature))

B: constant controlling the sensitivity (thermistor constant)

Since the resistance $R_0$ of the thermistor 70 becomes low at ordinary temperatures or at high temperatures and becomes high at low temperatures, the voltage $V_2$ varies by the same amount as the motor drive current varies. The amount of variation of the voltage $V_1$ corresponding to the motor drive current drastically increases when the temperature becomes lower than a specific temperature (−10° C. to −20° C.). This drastic increase is caused by the following factors. The door glass 20 is mechanically raised and lowered by the window regulator 16 while the peripheral edge of the door glass 20 is nipped by the weatherstrip made of rubber and built in the door frame 12A. At low temperatures, the window regulator 16 does not operate smoothly, and the resistance to the movement of the door glass 20 increases due to the hardening of the weatherstrip. For these reasons, the variation of the voltage $V_1$ drastically increases. Therefore, the voltage $V_2$ is drastically varied in accordance with the drastic changes in the motor drive current (see FIG. 4).

A signal of low level being output from the comparator 104 of the power window control section 50 signifies that the voltage $V_1$ corresponding to the motor drive current is not greater than the voltage $V_2$ corresponding to the comparison current. In this case, driving of the motor 22 is continued. A signal of high level being output from the comparator 104 signifies that the voltage $V_1$ corresponding to the motor drive current exceeds the voltage $V_2$ corresponding to the comparison current. In this case, it is judged that the motor is in a locked state, and the driving of the motor 22 is stopped.

Figure 5A:
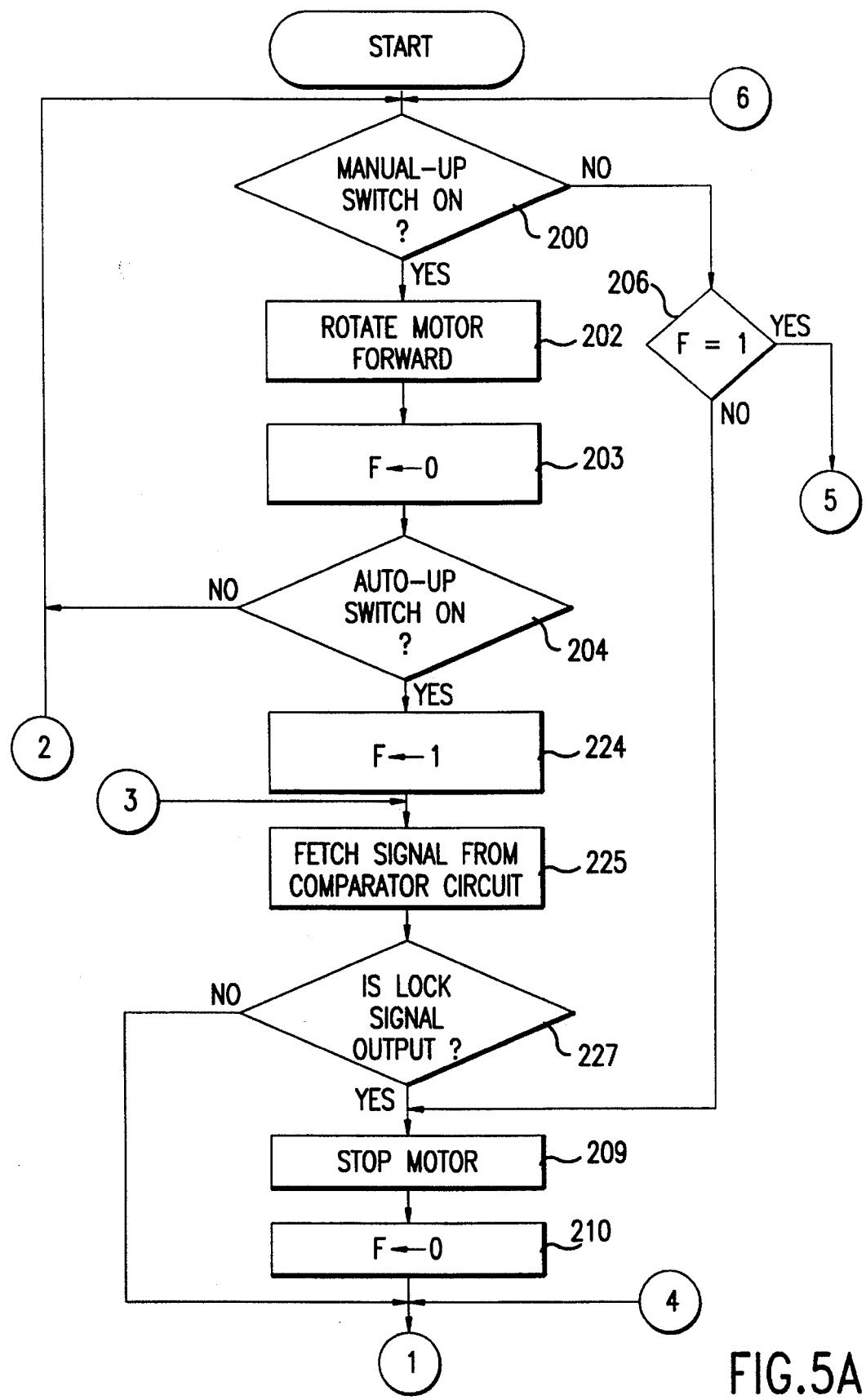
FIGS. 5A and 5B are flowcharts showing the main routine of processing according to the first embodiment.
Figure 5B:
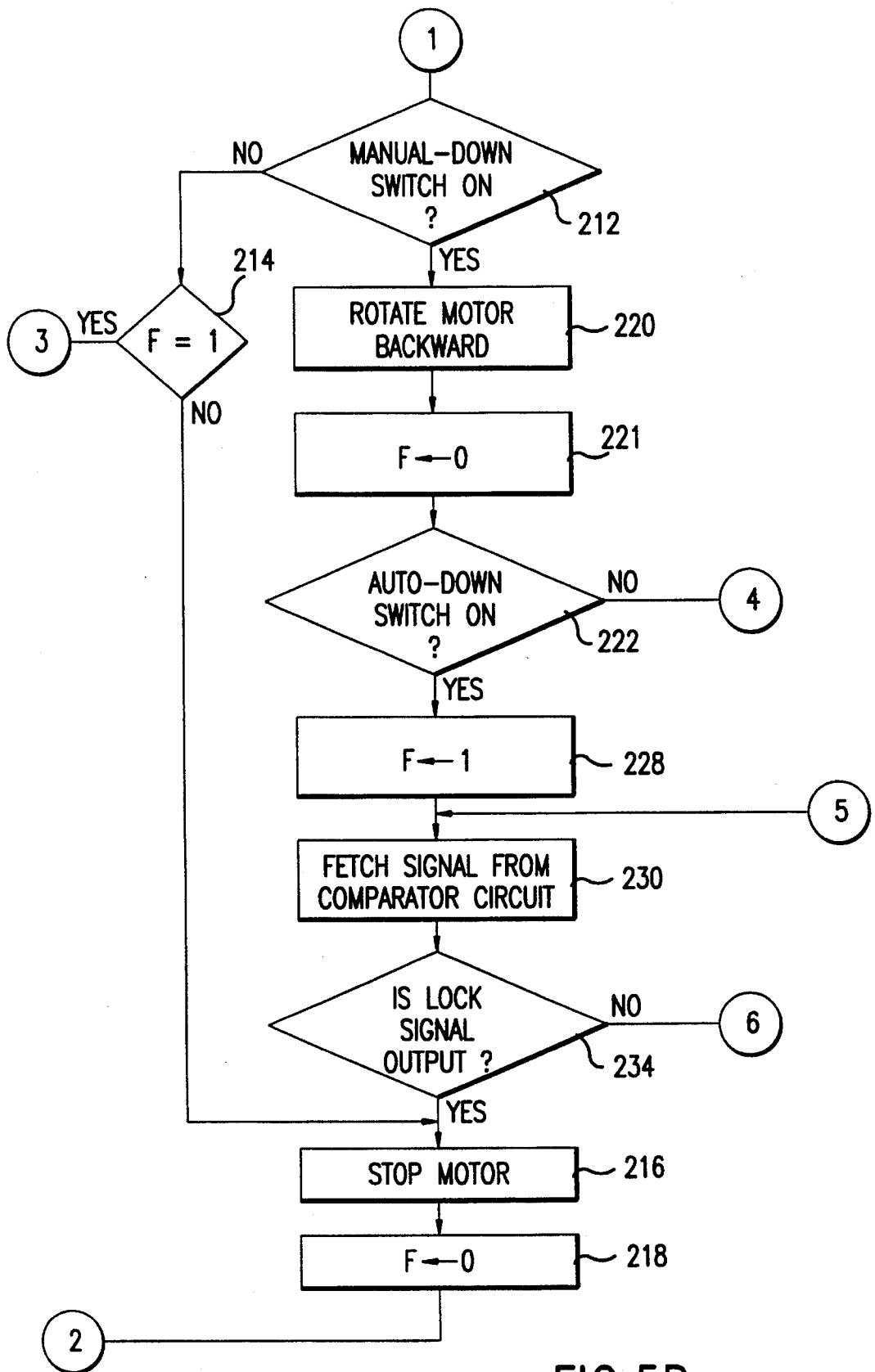

The operation of the first embodiment will now be described with reference to the flowchart in FIGS. 5A and 5B.

First, the driving and controlling of the power window apparatus which is carried out in the power window control section 50 will be described.

When the door glass 20 is raised in the manual operation mode, a switch 52A for manual-up is turned on in response to operation of the auto/manual switch 34. The on state of the switch 52A for manual-up is confirmed in step 200, and the process moves to step 202 in which the motor 22 is rotated forward. In the following step 203, a flag F is reset to "0". Accordingly, the raising of the door glass 20 begins. Since the switch for auto-up is off at this point, the answer of the determination in next step 204 is negative, and the process returns to step 200. As long as the on state of the switch 52A for manual-up continues, the processes in steps 200, 202, 203 and 204 are repeated.

When the driver releases the auto/manual switch 34, the switch 52A for manual-up is turned off. In this case, the determination in step 200 is negative, and the process moves to step 206. Since the flag F has already been reset to "0", a negative determination is made in step 206, and the process moves to step 209 in which driving of the motor 22 is stopped. After the flag F is reset in step 210 (even though the flag F is in the reset state), the process moves to step 212.

In step 212, it is determined whether a switch 52B for manual-down is in its on state. At the this time, a negative determination is made in step 212, and the process moves to step 214. Since the flag F has already been reset to "0", a negative determination is made in step 214, and the process moves to step 216 in which processing for stopping the motor 22 is carried out (even though the motor 22 has already been stopped). After the flag F is reset in step 218, the process returns to step 200.

In a case in which power is being supplied to the control section and the switches are not being operated, the processes in steps 200, 206, 209, 210, 212, 214, 216 and 218 (basic flow) are repeated until the on state of the switch 62A for manual-up is detected (in step 200) or until the on state of the switch 52B for manual-down is detected (in step 212).

When the door glass 20 is lowered in the manual operation mode, the switch 52B for manual-down is turned on in response to operation of the auto/manual switch 34. The on state of the switch 52B for manual-down is confirmed in step 212, and the process moves to step 220 in which the motor 22 is rotated reversely. In the following step 221, the flag F is reset to "0". Accordingly, lowering of the door glass 20 begins. Since a switch 52C for auto-down is off at this point, a negative determination is made in next step 222, and the process returns to step 212. As long as the on state of the switch 52B for manual-down continues, the processes in steps 212, 220, 221 and 222 are repeated.

When the driver stops operation of the auto/manual switch 34, the switch 52B for manual-down is turned off. In this case, processing (basic flow) for the above-described case in which the power supply is on and the switches are not operated is carried out.

When the driver wants to automatically raise the door glass 20, he or she operates the auto/manual switch 34 two steps in a predetermined first direction. Due to this operation, a switch for auto-up is turned on. In this case, the motor 22 begins to rotate forward in step 202, and the process then moves to step 203 and then to step 204. Since an affirmative determination is made in step 204, the process moves to step 224 in which the flag is set to "1". Thereafter, the process moves to step 225 in which the output signal from the comparator circuit 100 is fetched. In next step 227, it is determined whether the output signal is a lock signal (signal of high level).

When a negative determination is made in step 227, the process moves to step 212 in which it is determined whether the auto/manual switch 34 has been moved to the direction opposite to the first direction so that the switch 52B for manual-down is turned on. Namely, even when the door glass 20 is automatically raised, the motor 22 is immediately rotated reversely and the operation mode is changed to the above-described operation for manual-down if the switch 52B for manual-down is turned on.

When a negative determination is made in step 212, the operation for automatic mode is continued, and the process moves to step 214. Since the flag has been set to "1", an affirmative determination is made in step 214, and the processing returns to step 225 so that the processes in steps 225, 227, 212 and 214 are repeated. When an affirmative determination is made in step 227, the process moves to step 209 so as to stop the motor 22. The flag F is then reset in step 210. Subsequently, the above-described basic flow is carried out.

When the driver wants to automatically lower the door glass 20, he or she operates the auto/manual switch two 34 steps in the direction opposite to the first direction. Due to this operation, the switch for auto-down is turned on. In this case, the motor 22 begins to rotate reversely in step 220, and the process then moves to step 221 and then to step 222. Since an affirmative determination is made in step 222, the process moves to step 228 in which the flag is set to "1". Thereafter, the process moves to step 230 in which the output signal from the comparator circuit 100 is fetched. In next step 234, it is determined whether the output signal is a lock signal (signal of high level).

When a negative determination is made in step 234, the process moves to step 200 in which it is determined whether the auto/manual switch 34 has been moved to the first direction so that the switch 52A for manual-up is turned on. Namely, even when the door glass 20 is automatically lowered, the motor 22 is immediately rotated forward and the operation mode is changed to the above-described operation for manual-up if the switch 52A for manual-up is turned on.

When a negative determination is made in step 200, the operation for automatic mode is continued, and the process moves to step 206. Since the flag has been set to "1", an affirmative determination is made in step 206, and the process returns to step 230 so that the processes in steps 230, 234, 200 and 206 are repeated. When an affirmative determination is made in step 234, it is determined that the door glass is completely opened, and the process moves to step 216 so as to stop the motor 22. The flag F is then reset in step 218. Subsequently, the above-described basic flow is carried out.

Figure 4:
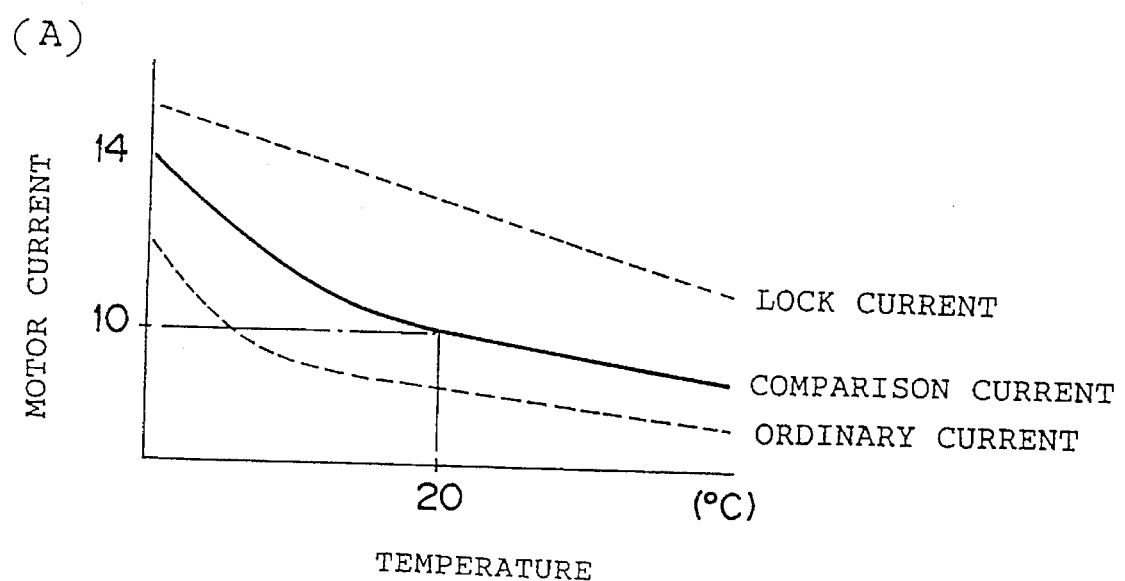
FIG. 4 is a graph of characteristics showing changes in ordinary drive current and lock current of a motor in the first embodiment with respect to variations in temperature.

Here, the signal output from the comparator circuit 100 becomes a high level signal (lock signal) when the voltage $V_1$ corresponding to the motor drive current exceeds the comparison voltage $V_2$, which varies in accordance with the temperature of the operating environment due to characteristics of the thermistor 70 (see FIG. 4).

The voltage $V_2$ corresponding to the comparison current is determined based on the resistances of the resistors 72, 78 and the resistance $R_0$ of the thermistor 70. The resistance $R_0$ varies depending on the temperature as indicated by the above equation (1). Accordingly, variation of the comparison current is represented by the variation of the voltage $V_2$ and corresponds to the variation of the motor drive current. As a result, a constant difference is maintained between the comparison current and the drive current regardless of whether the temperature is low or high. Accordingly, when the motor drive current varies due to a change in the resistance to the movement of the door glass 20 which is caused by a change in temperature, the comparison current also varies so as to follow the variation of the motor drive current.

Since the comparison current which is a threshold value varies in accordance with temperature, as described above, the comparison current does not exceed the motor lock current. This prevents the motor from being continuously driven in an overloaded state. Further, proper thermal compensation can be carried out.

SECOND EMBODIMENT

Next, a second embodiment of the present invention will be described with reference to FIG. 6 and FIG. 7. Since the structure of the power window apparatus 10 used in the second embodiment is the same as the structure shown in FIG. 2 and FIG. 3, an explanation of the structure will be omitted. Further, in the control block diagram shown in FIG. 6, elements which are the same as those shown in FIG. 1 are denoted by the same reference numerals. Explanations of these elements will be omitted.

Figure 6:
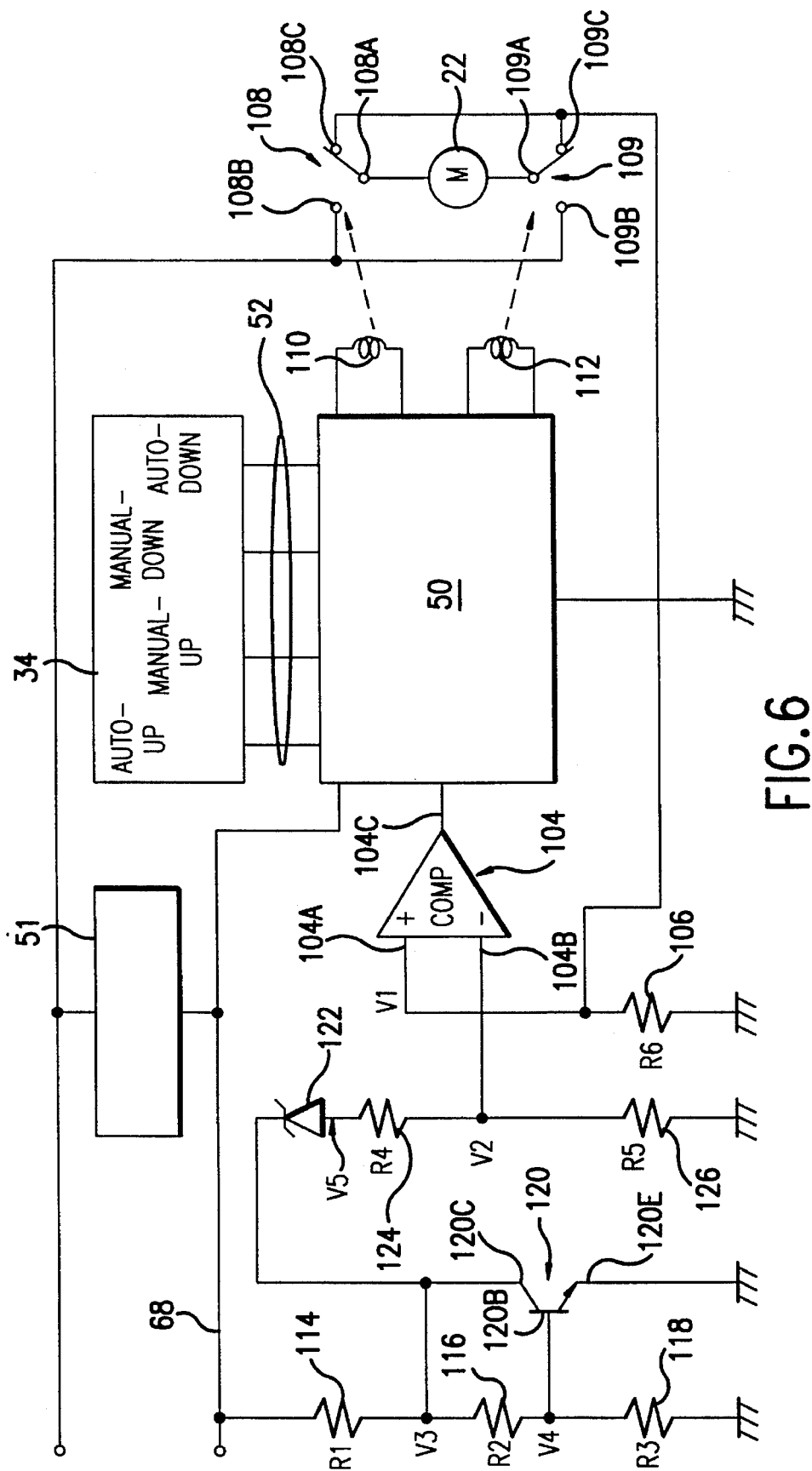
FIG. 6 is a circuit diagram showing an apparatus for driving and controlling a power window apparatus according to a second embodiment of the present invention.

As shown in FIG. 6, one end of a resistor 114 (whose resistance is $R_1$) is connected to the power supply line 68, and the other end of the resistor 114 is connected to one end of a series circuit including a resistor 116 (whose resistance is $R_2$) and a resistor 118 (whose resistance is $R_3$). One end of the resistor 18 is grounded.

A base 120B of a transistor 120 is connected to the connecting point between the resistor 116 and the resistor 118. An emitter 120E of the transistor 120 is grounded, and a collector 120C is connected to the cathode of a zener diode 122. The collector 120C is also connected to the line between the resistor 114 and the resistor 116.

The anode of the zener diode 122 is grounded via a resistor 124 (whose resistance is $R_4$) and a resistor 126 (whose resistance is $R_5$). The negative input terminal 104B of the comparator 104 is connected to the line between the resistor 124 and the resistor 126. Other structures are the same as those of the circuit shown in FIG. 1. Due to the drive current of the motor 22, a voltage $V_1$ is produced across the resistor 106 (whose resistance is $R_6$) and is input to the positive input terminal 104 A.

The voltage $V_2$ input to the negative input terminal 104B of the comparator 104 is set as follows.

When the voltage between the base and emitter of the transistor 120 is defined as $V_{be}$, and the voltage between both ends of the resistor 118 ($R_3$) is defined as $V_4$, the voltage $V_3$ at both ends of the serially connected resistors 116 and 118 is expressed as follows:

$$V_3 = V_4 \times \frac{(R_2 + R_3)}{R_3} = V_{be} \times \frac{(R_2 + R_3)}{R_3}, \quad (2)$$

provided that the relation $R_1 \ll R_2, R_3$ is satisfied.

When the voltage between both ends of the zener diode 122 is defined as $V_{zd}$, the voltage $V_5$ between both ends of the serially connected resistors 124,126 is expressed as follows:

$$V_5 = V_3 - V_{ZD} = V_{be} \times \frac{(R_2 + R_3)}{R_3} - V_{ZD} \quad (3)$$

Accordingly, the voltage $V_2$ can be expressed as follows:

$$V_2 = V_5 \times \frac{R_5}{(R_5 + R_6)} = \left[ V_{be} \times \frac{(R_2 + R_3)}{R_3} - V_{ZD} \right] \times \frac{R_5}{(R_5 + R_6)} \quad (4)$$

Since the voltage $V_2$ varies depending on the thermal variation $dV_{be}$(V/°C.) and $dV_{ZD}$(V/°C.) of the transistor 120 and the zener diode 122, the variation $dV_2$ of the voltage $V_2$ is expressed as follows:

$$dV_2 = \frac{\left[ dV_{be} \times \frac{(R_2 + R_3)}{R_3} - dV_{ZD} \right]}{\left[ V_{be} \times \frac{(R_2 + R_3)}{R_3} - V_{ZD} \right]} \quad (5)$$

Figure 7:
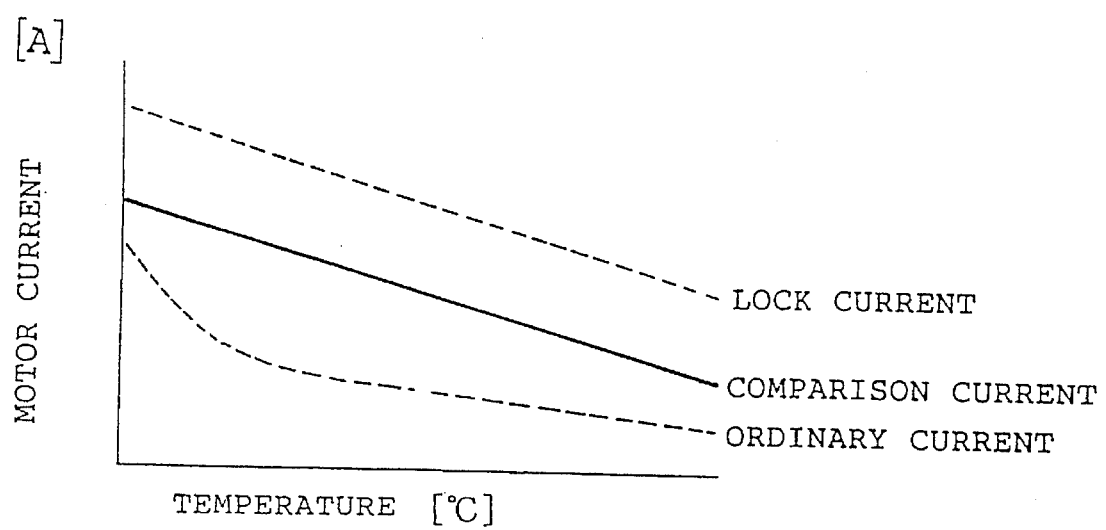
FIG. 7 is a graph of characteristics showing changes in drive current and lock current of a motor in the second embodiment with respect to variations in temperature.

As is apparent from the above, the comparison voltage $V_2$, which is used as a reference voltage for detection and which has an arbitrary thermal coefficient, can be generated by selecting the resistance $R_2$ of the resistor 116, the resistance $R_3$ of the resistor 118, and the zener diode 122 (see FIG. 7). Since the amount of variation of the voltage $V_2$ is made to coincide with the amount of variation of the motor lock current, the motor 22 can always be stopped when the drive current is at a level which is lower than the motor lock current by a predetermined amount. Therefore, it is possible to prevent the motor from being driven in an overloaded state. Since the level (voltage $V_2$) does not become smaller than the voltage $V_1$ corresponding to the ordinary drive current of the motor 22, the motor 22 can be driven properly regardless of whether the temperature is low or high. Further, the motor 22 can be reliably stopped when the door glass is fully closed or fully opened.

In the first and second embodiments, the voltage indicating a comparison current, with which the motor drive current is compared in order to detect the completely-closed or completely-opened state of the door glass 20, is varied. However, the present invention can be applied to a comparison value which is used for detecting a state in which a foreign object is caught by the door glass 20.

What is claimed is:

1. An apparatus for controlling a motor that moves a movable window portion of a vehicle, the apparatus comprising:

current detection means for detecting a value of current flowing through said motor when said motor is moving said movable portion;

control means for comparing the current value detected by said current detection means with a comparison current value, and for controlling said motor based on the comparison of the detected current value with said comparison current value;

temperature sensing means for sensing a temperature of an environment of said movable portion; and comparison current varying means for varying said comparison current value based on the temperature sensed by said temperature sensing means.

2. The apparatus of claim 1, wherein said comparison current value is always varied by the comparison varying means to a value less than a value of a lock current value of said motor at all operation temperatures, said lock current value corresponding to current in the motor when the movable portion reaches an end-of-travel position.

3. The apparatus of claim 1, wherein said comparison current value is always varied by the comparison varying means to a value greater than a value of an ordinary drive current value of said motor at all operation temperatures, said ordinary drive current value corresponding current in the motor when the movable portion is moving.

4. The apparatus of claim 1, wherein said control means stops driving said motor when said detected current value exceeds said comparison current value.

5. The apparatus of claim 1, wherein said temperature sensing means comprises a thermistor.

6. The apparatus of claim 1, wherein said comparison current varying means comprises at least one of a transistor and a zener diode.

7. The apparatus of claim 1, wherein said movable portion is a glass window of a power window apparatus.

8. The apparatus of claim 7, wherein the value of the current detected by the current detection means is used to determine one of a completely-opened state and a completely-closed state of said glass window.

9. The apparatus of claim 7, wherein the value of the current detected by the current detection means is used to determine when an obstacle is caught between said glass window and a door glass frame.

\* \* \* \* \*

REEXAMINATION CERTIFICATE (3621st)

United States Patent [19]

Nishibe

[11] B1 5,488,276

[45] Certificate Issued Sep. 1, 1998

[54] APPARATUS FOR DRIVING AND CONTROLLING MOTOR

[75] Inventor: Yasushi Nishibe, Niwa, Japan

[73] Assignee: Kabushiki Kaisha Tokai-Rika-Denki-Seisakusho, Aichi-Ken, Japan

Reexamination Request:
No. 90/004,335, Aug. 19, 1996

Reexamination Certificate for:
Patent No.: 5,488,276
Issued: Jan. 30, 1996
Appl. No.: 170,817
Filed: Dec. 21, 1993

[30] Foreign Application Priority Data

Dec. 25, 1992 [JP] Japan ............... 4-346987

[51] Int. Cl.$^6$ ............... G05B 5/00
[52] U.S. Cl. ............... 318/473; 318/469; 318/282; 318/286; 318/641; 49/28
[58] Field of Search ............... 318/445–446, 318/466–473, 280, 282, 283, 285, 286, 641; 307/91, 101; 361/23–24, 31, 33; 49/26, 28, 31

[56] References Cited

U.S. PATENT DOCUMENTS

| | | | |
|---|---|---|---|
| 3,794,898 | 2/1974 | Gross | 318/380 |
| 3,936,711 | 2/1976 | Gay | 318/345 |
| 4,334,162 | 6/1982 | Haag et al. | 310/68 C |
| 4,550,277 | 10/1985 | Carney | 388/809 |
| 4,686,598 | 8/1987 | Herr | 361/131 |
| 4,701,684 | 10/1987 | Seidel et al. | 318/282 |
| 4,779,031 | 10/1988 | Arends | 318/565 |
| 5,038,088 | 8/1991 | Arends | 318/565 |
| 5,081,405 | 1/1992 | Nelson | 318/448 |
| 5,128,826 | 7/1992 | Yoneshige | 361/165 |
| 5,351,439 | 10/1994 | Takeda et al. | 49/28 |
| 5,428,493 | 6/1995 | Takeuchi et al. | 361/27 |

FOREIGN PATENT DOCUMENTS

| | | | |
|---|---|---|---|
| 34 22 485 A1 | 12/1985 | Germany | H02H 7/085 |
| 33 46 366 C2 | 5/1995 | Germany | H02H 7/08 |

*Primary Examiner*—David S. Martin

[57] ABSTRACT

An apparatus for driving and controlling a motor which moves a movable portion of a vehicle by driving force of the motor. The apparatus includes a drive stopping circuit for comparing a value of current detected by a current detection circuit, which detects drive current of the motor when the movable portion is being moved, with a predetermined comparison current value, and for stopping driving of the motor at a time when a detected current value exceeds the comparison current value. The apparatus also includes a comparison current varying circuit for varying the comparison current value based on a temperature of an environment of the movable portion. Since it is possible to carry out temperature compensation based on ordinary drive current and lock current of the motor, the comparison current value can be set within a wide range.

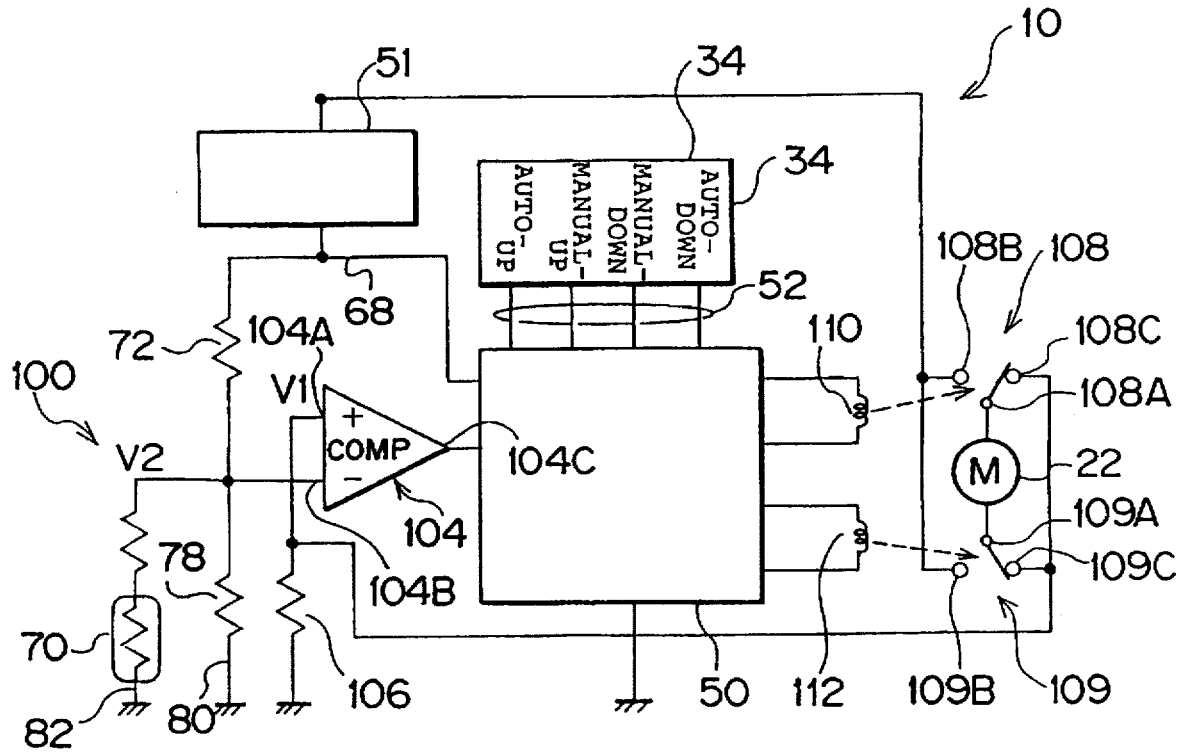

B1 5,488,276

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 is cancelled.

Claims 1 and 3 are determined to be patentable as amended.

Claims 2, 4, 5 and 7-9, dependent on an amended claim, are determined to be patentable.

New claims 10-17 are added and determined to be patentable.

1. An apparatus for controlling a motor that moves a movable window portion of a vehicle, the apparatus comprising:
   current detection means for detecting a *present* value of current flowing through said motor when said motor is moving said movable portion;
   control means for comparing the current value detected by said current detection means with a comparison current value, and for controlling said motor based on the comparison of the detected current value with said comparison current value;
   temperature sensing means for sensing a temperature of an environment of said movable portion, *wherein the temperature sensing means includes a thermistor connected to a voltage dividing circuit having at least three resistors each connected to a common node, one of the resistors connected in series between the common node and the thermistor;* and
   comparison current varying means for varying said comparison current value based on the temperature sensed by said temperature sensing means, *wherein an ordinary drive current value corresponds to a predetermined value of current flowing in the motor when the movable portion is moving, the ordinary drive current value varies based on the temperature of the environment, and wherein said comparison current varying means varies said comparison current value based on a temperature change of the environment of said movable portion and such that an amount of variation of said comparison current value is substantially equal to an amount of a variation of said ordinary drive current value caused by the temperature change of the environment.*

3. The apparatus of claim 1, wherein said comparison current value is always varied by the comparison varying means to a value greater than a value of [an] *the* ordinary drive current value of said motor at all operation temperatures[, said ordinary drive current value cooresponding current in the motor when the movable portion is moving].

*10. An apparatus for controlling a motor that moves a movable window portion of a vehicle, the apparatus comprising:*
   *current detection means for detecting a present value of current flowing through said motor when said motor is moving said movable portion;*
   *control means for comparing the current value detected by said current detection means with a comparison current value, and for controlling said motor based on the comparison of the detected current value with said comparison current value;*
   *temperature sensing means for sensing a temperature of an environment of said movable portion, wherein said temperature sensing means comprises a transistor and a zener diode; and*
   *comparison current varying means for varying said comparison current value based on the temperature sensed by said temperature sensing means, wherein a lock current value corresponds to a predetermined value of current flowing in the motor when the movable portion reaches an end-of-travel position, the lock current value varies based on the temperature of the environment, and wherein said comparison current varying means varies said comparison current value based on a temperature change of the environment of said movable portion and such that an amount of variation of said comparison current value is substantially equal to an amount of a variation of said lock current value caused by the temperature change of the environment.*

*11. An apparatus for controlling a motor that moves a movable window portion of a vehicle, the apparatus comprising:*
   *current detection means for detecting a present value of current flowing through said motor when said motor is moving said movable portion;*
   *control means for comparing the current value detected by said current detection means with a comparison current value, and for controlling said motor based on the comparison of the detected current value with said comparison current value;*
   *temperature sensing means for sensing a temperature of an environment of said movable portion, wherein an ordinary drive current value corresponds to a predetermined value of current flowing in the motor when the movable portion is moving, a lock current value corresponds to a predetermined value of current flowing in the motor when the movable portion reaches an end-of-travel position, the ordinary drive current value and the lock current value vary based on the temperature of the environment, wherein said temperature sensing means includes one of: 1) a thermistor connected to a voltage dividing circuit having at least three resistors each connected to a common node, one of the resistors connected in series between the common node and the thermistor; and 2) a transistor and a zener diode; and*
   *comparison current varying means for varying said comparison current value based on a temperature of the environment of said movable window portion and such that an amount of variation of said comparison current value is substantially equal to one of an amount of a variation of said lock current value caused by the temperature of the environment and an amount of a variation of said ordinary drive current value caused by the temperature of the environment.*

*12. The apparatus of claim 10, wherein said comparison current value is always varied by the comparison varying means to a value less than a value of the lock current value of said motor at all operation temperatures.*

13. The apparatus of claim 10, wherein said comparison current value is always varied by the comparison varying means to a value greater than a value of an ordinary drive current value of said motor at all operation temperatures, said ordinary drive current value corresponding to current in the motor when the movable portion is moving.

14. The apparatus of claim 10, wherein said control means stops driving said motor when said detected current value exceeds said comparison current value.

15. The apparatus of claim 10, wherein said movable portion is a glass window of a power window apparatus.

16. The apparatus of claim 15, wherein the value of the current detected by the current detection means is used to determine one of a completely-opened state and a completely-closed state of said glass window.

17. The apparatus of claim 15, wherein the value of the current detected by the current detection means is used to determine when an obstacle is caught between said glass window and a door glass frame.

* * * * *